United States Patent
Yoshiki

(10) Patent No.: US 7,728,990 B2
(45) Date of Patent: Jun. 1, 2010

(54) IMAGE MEASURING SYSTEM AND METHODS OF GENERATING AND EXECUTING NON-STOP IMAGE MEASURING PROGRAM

(75) Inventor: Ryoichi Yoshiki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/457,685

(22) Filed: Jun. 18, 2009

(65) Prior Publication Data

US 2009/0284759 A1 Nov. 19, 2009

Related U.S. Application Data

(62) Division of application No. 11/445,223, filed on Jun. 2, 2006, now Pat. No. 7,599,073.

(30) Foreign Application Priority Data

Apr. 19, 2005 (JP) ............................ 2005-120819
Jun. 3, 2005 (JP) ............................ 2005-164602

(51) Int. Cl.
*G01B 11/24* (2006.01)
(52) U.S. Cl. ...................... 356/614; 382/107
(58) Field of Classification Search ......... 356/614–623, 356/601, 628; 382/107
See application file for complete search history.

(56) References Cited

U.S. PATENT DOCUMENTS

| | | | |
|---|---|---|---|
| 5,719,970 A * | 2/1998 | Aoki et al. ................... | 382/313 |
| 6,490,048 B1 | 12/2002 | Rudd et al. | |
| 7,268,894 B2 | 9/2007 | Matsumiya et al. | |
| 2004/0008332 A1* | 1/2004 | Nakaya et al. ................. | 355/53 |
| 2004/0156054 A1 | 8/2004 | Christoph | |
| 2005/0111062 A1* | 5/2005 | Fukui et al. .................. | 358/514 |
| 2006/0274330 A1 | 12/2006 | Matsumiya et al. | |
| 2007/0201041 A1 | 8/2007 | Fujimaki et al. | |

FOREIGN PATENT DOCUMENTS

| | | |
|---|---|---|
| JP | A-2004-535587 | 11/2004 |
| WO | WO 03/009070 A2 | 1/2003 |

* cited by examiner

*Primary Examiner*—Hoa Q Pham
(74) *Attorney, Agent, or Firm*—Oliff & Berridge, PLC

(57) ABSTRACT

The position of an imaging means relative to a measurement stage is moved based on a stage movement instruction input. The amount of light illuminating a work is adjusted by flashing strobe illumination at a certain cycle repeatedly and adjusting the pulse width of the strobe illumination based on an illumination adjustment instruction input. A part program is generated for image measurement including fetching positional information about the imaging means relative to the measurement stage and information about the pulse width of the strobe illumination based on a certain instruction input, irradiating the measuring object with strobe illumination of the pulse width passing through the position indicated by the fetched positional information and fetched at that position, and capturing instantaneous image information about the work.

4 Claims, 12 Drawing Sheets

FIG. 6

```
Private Sub QVBlock_1

Lens.NomMag = 5.000000

StrobedPath.SetLighting    Coax:=0.12, Stage:=0.00, Back:=0.00, Front:=0.00, Right:=0.00, Left:=0.00

StrobedPath.AllowedBlur = 0.10

StrobedPath.AddStep    x:=175.6985000, y:=54.1447000, z:=4.9469000, WayPoint:=false StrobedPath.AddStep    x:=178.8551000, y:=54.1447000, z:=4.9469000, WayPoint:=false StrobedPath.AddStep    x:=182.2516000, y:=51.3825000, z:=4.9468000, WayPoint:=false StrobedPath.Acquire End Sub    'QVBlock_1

Private Sub QVBlock_2

Measure.Point Label:="", ProjPlane:=NO_PLANE

StrobedPath.LoadNextImage       '(loads image from x:=175.6985000, y:=54.1447000, z:=4.9469000)

PointTool.SetFilter    Alg:=DYNAMIC_THRESH, EdgeSlope:=FALLING, EdgeQuality:=STRONG,

TH:=183.048000, THR:=0.654077, THS:=43.000000

PointTool.Run    X:=175.7279000, Y:=54.1251000, Z:=4.9469000, L:=0.2450000, Angle:=-163.0000

Measure.EndMeas

End Sub    'QVBlock_2

Private Sub QVBlock_3

Measure.Point Label:="", ProjPlane:=NO_PLANE

StrobedPath.LoadNextImage       '(loads image from x:=178.8551000, y:=54.1447000, z:=4.9469000)

PointTool.SetFilter    Alg:=DYNAMIC_THRESH, EdgeSlope:=RISING, EdgeQuality:=STRONG,

TH:=165.073171, THR:=0.559182, THS:=52.500000

PointTool.Run    X:=178.8870500, Y:=54.0834500, Z:=4.9469000, L:=0.2450000, Angle:=20.0000

Measure.EndMeas

End Sub    'QVBlock_3
```

Illumination Setting

Movement Path Command

Measurement Start (Non-Stop Image Acquisition)

Parallel Creation of Movement Path and Measurement Command

Image Reading

FIG. 9

| | |
|---|---|
| Private Sub QVBlock_1 | |
| QVPAK.ChangeMode mode:=NonSTOP | Mode Switching |
| StrobedPath.Start | Non-Stop Measurement Start |
| | |
| Lens.NomMag = 5.0 | Magnification Setting |
| StrobedPath.SetLighting    Coax:=0.12, Stage:=0, Back:=0, Front:=0, Right:=0, Left:=0 | Illumination Alteration |
| StrobedPath.AllowedBlur = 0.10 | Non-Stop Measurement Condition Setting |
| End Sub    'QVBlock_1 | |
| | |
| Private Sub QVBlock_2 | |
| StrobedPath.AddStep    x:=175.698, y:=54.144, z:=4.946, WayPoint:=false | Movement Path Command |
| Measure.Point Label:="", ProjPlane:=NO_PLANE | Measurement Start |
| StrobedPath.LoadNextImage    '(loads image from x:=175.698, y:=54.144, z:=4.946) | Image Reading |
| PointTool.SetFilter    Alg:=DYNAMIC_THRESH, EdgeSlope:=FALLING, EdgeQuality:=STRONG, TH:=183, THR:=0.6, THS:=43 | Measurement Condition Setting |
| PointTool.Run    X:=175.727, Y:=54.125, Z:=4.946, L:=0.245, Angle:=-163 | Image Processing (Edge Detection) |
| Measure.EndMeas | Measurement End |
| End Sub    'QVBlock_2 | |
| | |
| Private Sub QVBlock_3 | |
| StrobedPath.AddStep    x:=178.855, y:=54.144, z:=4.946, WayPoint:=false | Movement Path Command |
| Measure.Point Label:="", ProjPlane:=NO_PLANE | Measurement Start |
| StrobedPath.LoadNextImage    '(loads image from x:=178.855, y:=54.144, z:=4.9469) | Image Reading |
| PointTool.SetFilter    Alg:=DYNAMIC_THRESH, EdgeSlope:=RISING, EdgeQuality:=STRONG, TH:=165, THR:=0.5, THS:=52 | Measurement Condition Setting |
| PointTool.Run    X:=178.887, Y:=54.083, Z:=4.946, L:=0.245, Angle:=20 | Image Processing (Edge Detection) |
| Measure.EndMeas | Measurement End |
| | |
| StrobedPath.Acquire | Non-Stop Image Acquisition |
| QVPAK.ChangeMode mode:=Standard | Mode Switching |
| End Sub    'QVBlock_3 | |

FIG. 11A

```
First
Private Sub QVBlock_1

QVPAK.ChangeMode mode:=NonSTOP

Lens.NomMag = 5.0

StrobedPath.SetLighting    Coax:=0.12, Stage:=0, Back:=0, Front:=0, Right:=0, Left:=0

StrobedPath.AllowedBlur = 0.10

End Sub   'QVBlock_1

Private Sub QVBlock_2

StrobedPath.AddStep    x:=175.698, y:=54.144, z:=4.946, WayPoint:=false

Measure.Point Label:="", ProjPlane:=NO_PLANE

StrobedPath.LoadNextImage    '(loads image from x:=175.698, y:=54.144, z:=4.946)

PointTool.SetFilter    Alg:=DYNAMIC_THRESH, EdgeSlope:=FALLING, EdgeQuality:=STRONG,

TH:=183, THR:=0.6, THS:=43

PointTool.Run    X:=175.727, Y:=54.125, Z:=4.946, L:=0.245, Angle:=-163

Measure.EndMeas

End Sub   'QVBlock_2

Private Sub QVBlock_3

StrobedPath.AddStep    x:=178.855, y:=54.144, z:=4.946, WayPoint:=false

Measure.Point Label:="", ProjPlane:=NO_PLANE

StrobedPath.LoadNextImage    '(loads image from x:=178.855, y:=54.144, z:=4.946)

PointTool.SetFilter    Alg:=DYNAMIC_THRESH, EdgeSlope:=RISING, EdgeQuality:=STRONG,

TH:=165, THR:=0.5, THS:=52

PointTool.Run    X:=178.887, Y:=54.083, Z:=4.946, L:=0.245, Angle:=20

Measure.EndMeas

StrobedPath.Acquire

QVPAK.ChangeMode mode:=Standard

End Sub   'QVBlock_3
```

Annotations (right side):
- Mode Switching
- Magnification Setting
- Illumination Alteration
- Non-Stop Measurement Condition Setting
- Movement Path Command
- Movement Path Command
- Non-Stop Image Acquisition
- Mode Switching

FIG. 11B

Second

```
Private Sub QVBlock_1

QVPAK.ChangeMode mode:=NonSTOP                                               Mode Switching Lens.NomMag = 5.0

StrobedPath.SetLighting   Coax:=0.12, Stage:=0, Back:=0, Front:=0, Right:=0, Left:=0

StrobedPath.AllowedBlur = 0.10

End Sub    'QVBlock_1

Private Sub QVBlock_2

StrobedPath.AddStep    x:=175.698, y:=54.144, z:=4.946, WayPoint:=false
                                                                             Measurement
Measure.Point Label:="", ProjPlane:=NO_PLANE                                 Start StrobedPath.LoadNextImage    '(loads image from x:=175.698, y:=54.144, z:=4.946)   Image Reading PointTool.SetFilter    Alg:=DYNAMIC_THRESH, EdgeSlope:=FALLING, EdgeQuality:=STRONG,   Measurement
                                                                             Condition Setting
TH:=183, THR:=0.6, THS:=43
                                                                             Image Processing
PointTool.Run    X:=175.727, Y:=54.125, Z:=4.946, L:=0.245, Angle:=-163       (Edge Detection)

Measure.EndMeas                                                              Measurement End End Sub    'QVBlock_2

Private Sub QVBlock_3

StrobedPath.AddStep    x:=178.855, y:=54.144, z:=4.946, WayPoint:=false
                                                                             Measurement
Measure.Point Label:="", ProjPlane:=NO_PLANE                                 Start StrobedPath.LoadNextImage    '(loads image from x:=178.855, y:=54.144, z:=4.9469)   Image Reading PointTool.SetFilter    Alg:=DYNAMIC_THRESH, EdgeSlope:=RISING, EdgeQuality:=STRONG,   Measurement
                                                                             Condition Setting
TH:=165, THR:=0.5, THS:=52
                                                                             Image Processing
PointTool.Run    X:=178.887, Y:=54.083, Z:=4.946, L:=0.245, Angle:=20          (Edge Detection)

Measure.EndMeas                                                              Measurement End StrobedPath.Acquire QVPAK.ChangeMode mode:=Standard                                              Mode Switching End Sub    'QVBlock_3
```

IMAGE MEASURING SYSTEM AND METHODS OF GENERATING AND EXECUTING NON-STOP IMAGE MEASURING PROGRAM

CROSS REFERENCE TO RELATED APPLICATION

This is a Division of application Ser. No. 11/445,223 filed Jun. 2, 2006, now U.S. Pat. No. 7,599,073 which claims the benefit of priority from the prior Japanese Patent Application No. 2005-164602, filed on Jun. 3, 2005, the entire contents of which are incorporated herein by reference.

BACKGROUND OF THE INVENTION

1. Field of the Invention

The present invention relates to an image measuring system and methods of generating and executing a non-stop image measuring program, having a non-stop measurement mode for image measurement, in which an imaging means moves relative to a measuring object supported on a measurement stage and captures instantaneous image information at designated measurement positions without making a stop.

2. Description of the Related Art

A conventional CNC image measuring machine comprises a measurement stage, which is moved relative to an imaging means such as a CCD camera and stopped at a measurement position as shown in FIG. 12. Then, the amount of illuminating light is adjusted to acquire image information about a measuring object. To the acquired image information, image processing such as setting of a measuring tool and edge detection is applied, thereby executing a measurement at one measurement position. This measurement is repeated as Measurement 1, Measurement 2, . . . and so on for all measurement positions to achieve measurements at required positions (hereinafter, such the measurement mode is referred to as a "standard measurement mode").

In contrast, for the purpose of improving the throughput of measurement, a measurement may be performed without making a stop of the measurement stage relative to the imaging means even at a measurement position in a measurement mode (hereinafter, such the measurement mode is referred to as a "non-stop measurement mode"). An image measuring machine having such the non-stop measurement mode has been proposed (see JP-A 2004-535587, paragraphs 0005-0006, FIG. 2). This image measuring machine irradiates the measuring object with strobe illumination, as shown in FIG. 13, without making a stop of the measurement stage at measurement positions. Alternatively, it captures instantaneous image information imaged using a shuttered CCD camera, for image measurement. In the non-stop measurement mode, when the relation between the movement speed of the stage and the strobe pulse width is appropriately set, a faster measurement can be achieved as an effect, without lowering the measurement accuracy much.

In the conventional image measuring machine operative in the standard measurement mode, on teaching to generate a part program for measurement, the measurement stage is manually moved to a measurement position, followed by an illumination adjustment. Then, a measurement instruction is given to set the measurement position and the illumination condition.

In the above-described non-stop measurement mode, however, image information is captured as strobe-imaged while the measurement stage is kept moving relative to the imaging means at a measurement position. Accordingly, the conventional teaching method in the standard measurement mode that makes a stop at each measurement position for the illumination adjustment can not be applied to the non-stop measurement mode as it is. This is a problem.

The present invention has been made in consideration of such the problem and has an object to provide an image measuring system and methods of generating and executing a non-stop image measuring program, capable of generating or executing a measuring program in the non-stop measurement mode with a teaching method similar to the conventional one.

SUMMARY OF THE INVENTION

To achieve the above object, the present invention provides a method of generating a non-stop image measuring program for image measurement including moving an imaging means relative to a measurement stage supporting a measuring object while irradiating the measuring object with strobe illumination and capturing instantaneous image information about the measuring object at designated measurement positions without making a stop of the imaging means. The method comprises steps of: moving the position of the imaging means relative to the measurement stage based on a stage movement instruction input; adjusting the amount of light illuminating the measuring object by flashing the strobe illumination at a certain cycle repeatedly and adjusting the pulse width of the strobe illumination based on an illumination adjustment instruction input; and generating the measuring program for image measurement including fetching positional information about the imaging means relative to the measurement stage and information about the pulse width of the strobe illumination based on a certain instruction input, irradiating the measuring object while passing through the position indicated by the fetched positional information, with the strobe illumination of the pulse width fetched at that position, and capturing instantaneous image information about the measuring object.

The present invention also provides a method of executing a non-stop image measuring program for image measurement including moving an imaging means relative to a measurement stage supporting a measuring object while irradiating the measuring object with strobe illumination and capturing instantaneous image information about the measuring object at designated measurement positions without making a stop of the imaging means. The method comprises executing the measuring program twice repeatedly; executing, in the first execution, processing for moving the imaging means relative to the measurement stage along a path passing through the position indicated by plural pieces of positional information described in the measuring program while irradiating the measuring object with the strobe illumination and acquiring instantaneous image information about the measuring object at the position designated by the positional information; and executing, in the second execution, processing for reading the captured image information and certain image processing to the read image information.

The present invention further provides a first image measuring system having a non-stop measurement mode for image measurement including moving an imaging means relative to a measurement stage supporting a measuring object while irradiating the measuring object with strobe illumination and capturing instantaneous image information about the measuring object at designated measurement positions without making a stop of the imaging means. The system comprises a means operative to enter a stage movement instruction, an illumination adjustment instruction and other certain instructions; a means operative to move the position of the imaging means relative to the measurement stage based on the entered stage movement instruction; a means operative to adjust the amount of light illuminating the measuring object by flashing the strobe illumination at a certain cycle repeatedly and adjusting the pulse width of the strobe illumination based on the entered illumination adjustment instruction; and a means operative to generate the measuring program for image measurement including fetching positional information about the imaging means relative to the measurement stage and information about the pulse width of the strobe illumination based on the entered certain instructions, irradiating the measuring object while passing through the position indicated by the fetched positional information, with the strobe illumination of the pulse width fetched at that position, and capturing instantaneous image information about the measuring object.

The present invention also provides a second image measuring system having a non-stop measurement mode for image measurement including moving an imaging means relative to a measurement stage supporting a measuring object while irradiating the measuring object with strobe illumination and capturing instantaneous image information about the measuring object at designated measurement positions without making a stop of the imaging means. The system comprises a measuring program executing means operative for executing the measuring program twice repeatedly in the non-stop measurement mode, executing, in the first execution, processing for moving the imaging means relative to the measurement stage along a path passing through the position indicated by plural pieces of positional information described in the measuring program while irradiating the measuring object with the strobe illumination and acquiring instantaneous image information about the measuring object at the position designated by the positional information, and executing, in the second execution, processing for reading the captured image information and certain image processing to the read image information.

In the method of generating a non-stop image measuring program and the first image measuring system according to the present invention, on teaching, the imaging means and the measurement stage have such a positional relation therebetween as relatively fixed at an image acquisition position. In this state, the strobe illumination is flashed toward the measuring object at a certain cycle repeatedly, and the pulse width is adjusted based on an entered instruction on the amount of light while confirming the brightness of the image. In contrast, on executing the measuring program, the strobe illumination is lightened based on the information about the adjusted pulse width, thereby acquiring image information about the measuring object. Therefore, a non-stop image measuring program can be generated through teaching with a method similar to the standard measurement mode.

In the method of executing a non-stop image measuring program and the second image measuring system according to the present invention, the measuring program is executed twice repeatedly. In the first execution, processing for moving the imaging means relative to the measurement stage and acquiring instantaneous image information at the designated position is executed. In the second execution, processing for reading the captured image information and image processing are executed together. Therefore, the measuring program can be configured similar to the conventional standard measurement mode. As a result, a measuring program for non-stop image measurement can be generated through teaching with a method similar to the standard measurement mode.

BRIEF DESCRIPTION OF THE DRAWINGS

FIG. 6 shows a part program of an embodiment 1-1;

FIG. 9 shows a part program of an embodiment 1-2;

FIG. 11A shows a first execution portion of the part program of the embodiment 1-2;

FIG. 11B shows a second execution portion of the part program of the embodiment 1-2;

DETAILED DESCRIPTION OF THE INVENTION

Embodiments of the present invention will be described next based on the accompanying drawings.

Embodiment 1

Figure 1:
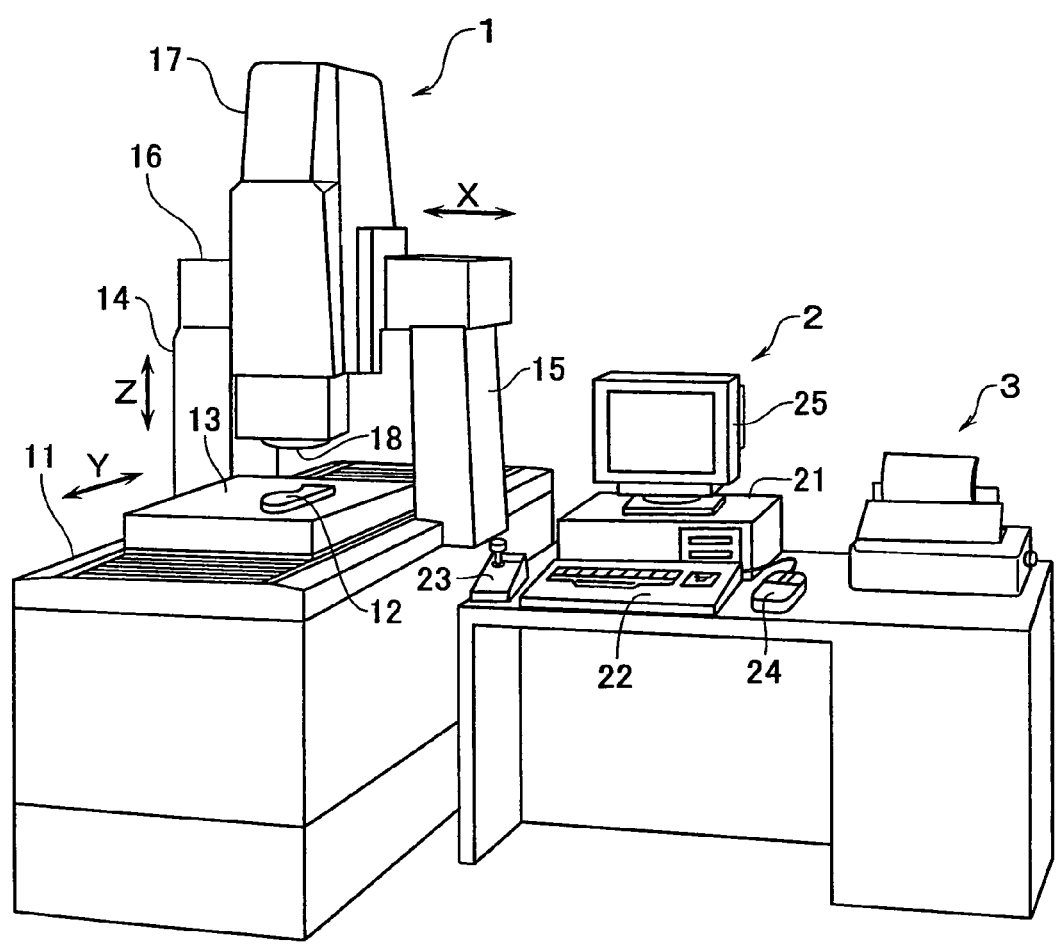
FIG. 1 is an external perspective view showing a configuration of an image measuring system according to an embodiment of the present invention.

FIG. 1 is a perspective view showing an entire configuration of an image measuring system according to an embodiment of the present invention. This system comprises a non-contact image measuring machine 1, a computer system 2 operative to drive/control the image measuring machine 1 and execute required data processing, and a printer 3 operative to print out a measurement result.

The image measuring machine 1 is configured as follows. A table 11 is provided and a measurement stage 13 is installed thereon to receive a measuring object (hereinafter referred to as a work) 12 mounted thereon. The measurement stage 13 is driven in the Y-axis direction by a Y-axis drive mechanism, not shown. Fixed at the central portion between both edges of the table 11 are support arms 14, 15 extending upward. An X-axis guide 16 is fixed to the support arms 14, 15 to link both upper ends thereof. An imaging unit 17 is supported on the X-axis guide 16. The imaging unit 17 is driven along the X-axis guide 16 by an X-axis drive mechanism, not shown. A CCD camera 18 is installed on a lower end of the imaging unit 17 as opposed to the measurement stage 13. The imaging unit 17 contains an illuminator and a focusing mechanism, not shown, as well as a Z-axis drive mechanism operative to shift the position of the CCD camera 18 in the Z-axis direction.

Figure 2:
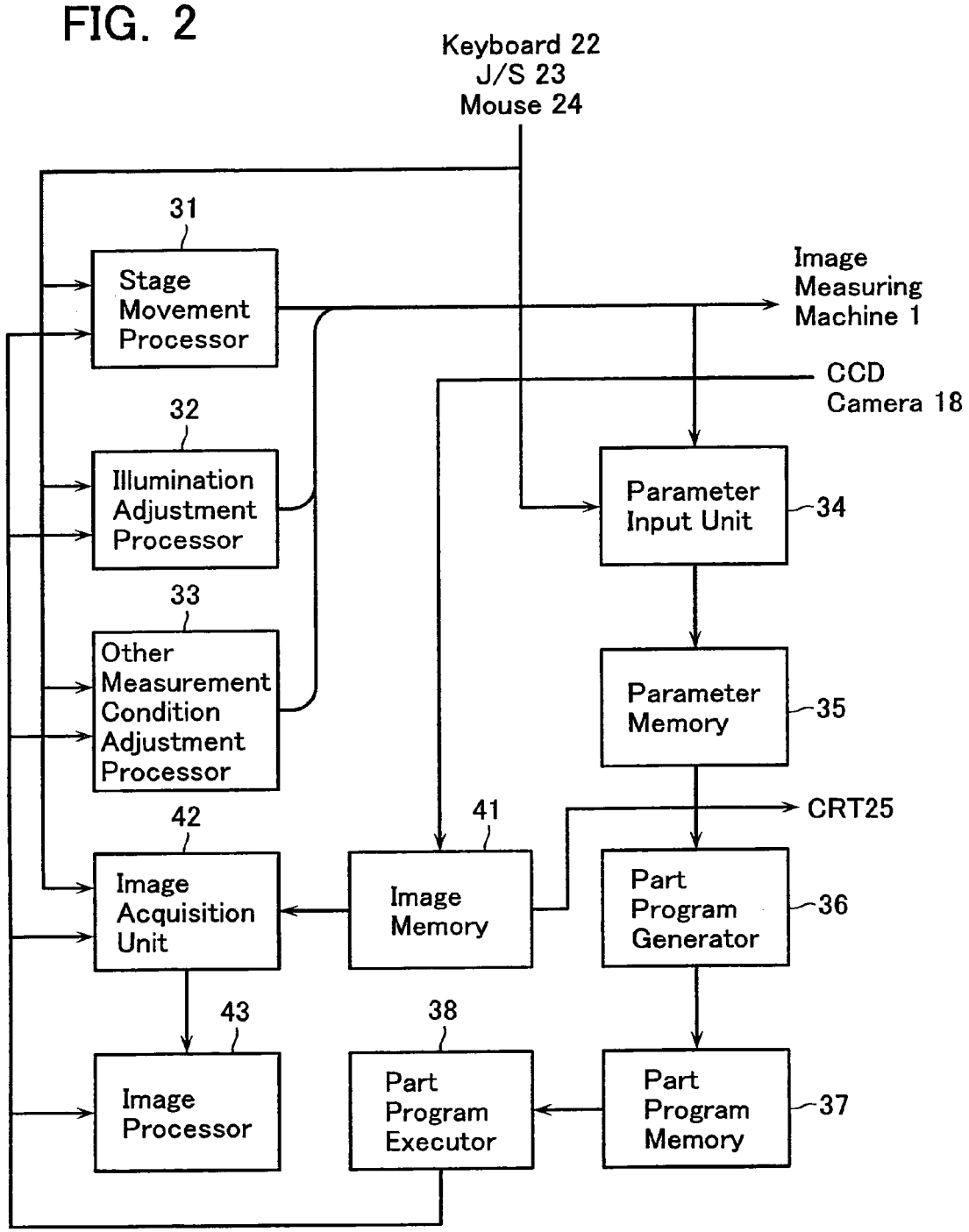
FIG. 2 is a functional block diagram of a computer in the same measuring system.

The computer system 2 includes a computer body 21, a keyboard 22, a joystick box (hereinafter referred to as J/S) 23, a mouse 24, and a display unit 25. The computer body 21 realizes various functions as shown in FIG. 2 together with certain programs stored therein.

It includes a stage movement processor 31 for controlling the image measuring machine 1 based on an instruction input from input means such as the keyboard 22, the J/S 23 and the mouse 24; an illumination adjustment processor 32; and an other measurement condition adjustment processor 33. The stage movement processor 31 controls the XYZ-axes drive mechanisms in the image measuring machine 1 based on a stage movement instruction input from input means to shift the position of the CCD camera 18 relative to the measurement stage 13. At the time of teaching, the illumination adjustment processor 32 flashes the illuminator in the image measuring machine 1 as a strobe light at a certain cycle successively and adjusts the pulse width of the strobe light based on an illumination adjustment instruction input from input means. In a non-stop measurement mode, it flashes the strobe light with a predetermined pulse width at designated measurement positions. The other measurement condition adjustment processor 33 adjusts other measurement conditions such as lens magnification and focusing adjustment based on instruction inputs for other measurement condition adjustments.

The stage position, the information about the pulse width of the strobe light and the information about the other measurement conditions adjusted at the processors 31-33 are fetched into a parameter input unit 34 based on a certain instruction input from input means. The parameter fetched in the parameter input unit 34 is stored in a parameter memory 35. A part program generator 36 uses the parameter stored in the parameter memory 35 to generate a part program for measurement. If input means instructs a non-stop measurement mode, the part program generator 36 generates a part program for the non-stop measurement mode. The generated part program is stored in a part program memory 37.

A part program executor 38 is operative to read a required part program out of the part program memory 37 and execute it. In accordance with various commands described in the part program, the part program executor drives the stage movement processor 31, the illumination adjustment processor 32, the other measurement condition adjustment processor 33, an image acquisition unit 42 and an image processor 43 appropriately. The pieces of image information imaged at the CCD camera 18 are sequentially stored in an image memory 41. The pieces of image information stored in the image memory 41 are sequentially displayed on the display unit 25 and captured by the image acquisition unit 42 as still images based on the part program. To the image information acquired at the image acquisition unit 42, the image processor 43 executes image processing for image measurement, such as setting of a measuring tool, detection of edges, and detection of coordinates.

A measurement operation of the image measuring system according to the embodiment thus configured and a method of generating a part program are described next.

Figure 3:
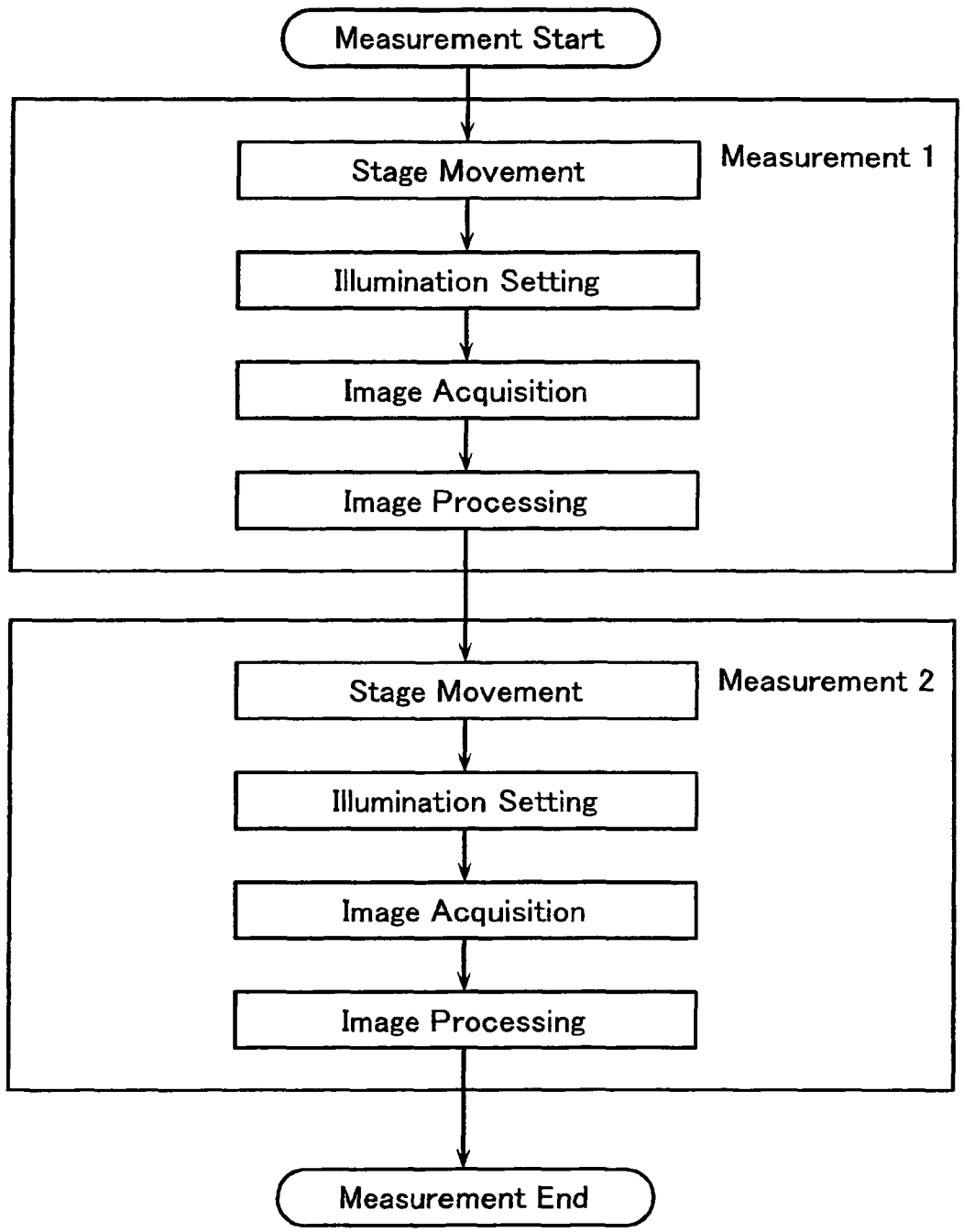
FIG. 3 is a flowchart showing a measurement procedure in a standard measurement mode.

FIG. 3 is a flowchart showing a procedure of image measurement in the conventional standard measurement mode. As shown, the image measurement in the standard measurement mode includes sequential executions of stage movement, illumination setting, image acquisition and image processing in a procedure per measurement element. After completion of the measurement at the position, the measurement position is moved to the next to execute similar processing. Thus, the image measurement in the standard measurement mode completes a measurement at each element (such as a point measurement 1, a point measurement 2, . . . ).

Figure 4:
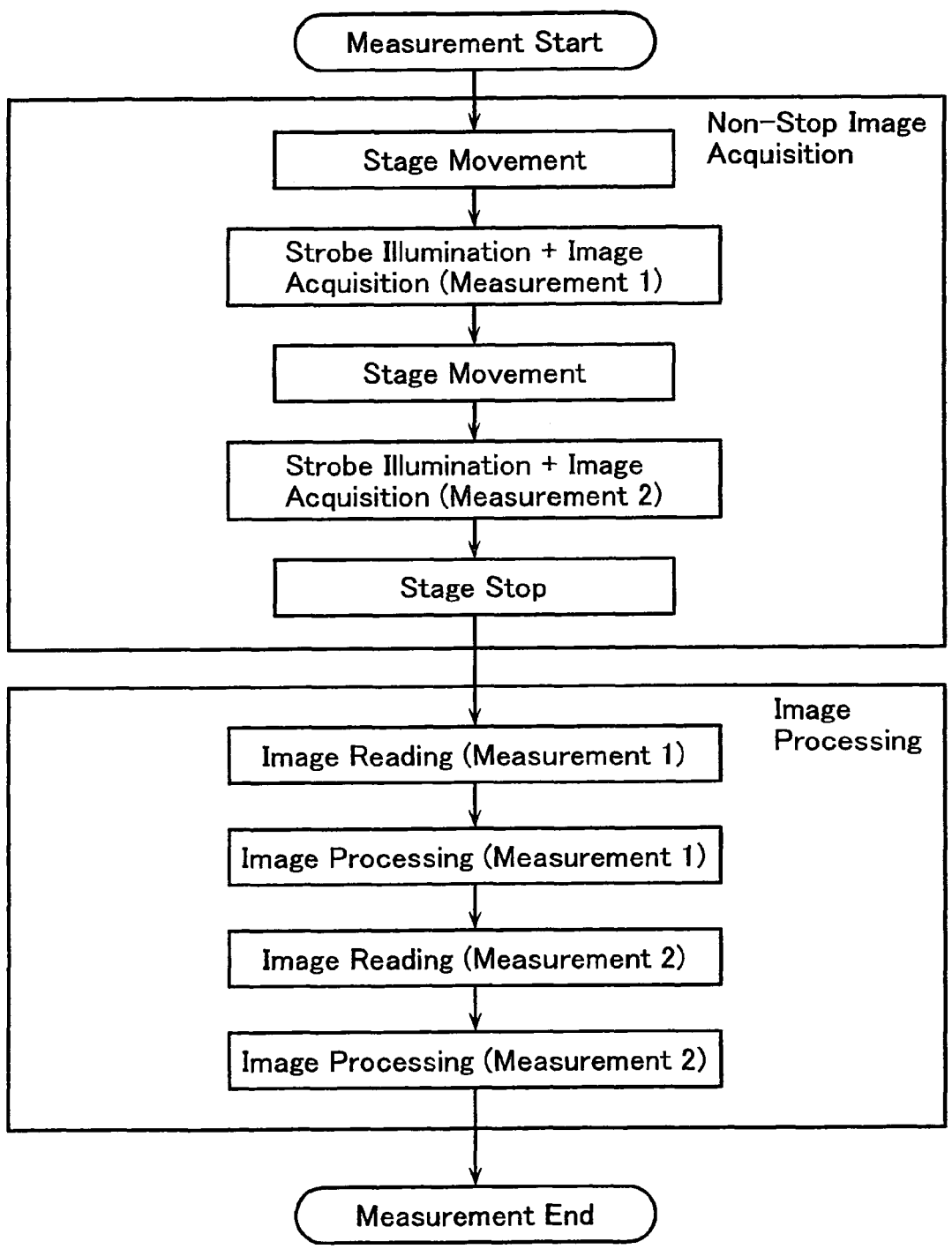
FIG. 4 is a flowchart showing a measurement procedure in a non-stop measurement mode.

To the contrary, in the non-stop measurement mode, measurement processing is separated into non-stop image acquisition and image processing as shown in FIG. 4. In the non-stop image acquisition, while the position of the measurement stage 13 relative to the CCD camera 18 is shifted along a measurement path that passes through each measurement position, strobe illumination and image acquisition (and saving) are successively executed for all measurement positions at an instance on passing through the measurement position. After completion of all image acquisitions, image processing is executed. In the image processing, the acquired and saved pieces of image information are read out one by one. In addition, image processing such as edge detection is successively executed for all measurement positions. The non-stop measurement mode requires no confirmation of a stop of the stage as in the standard measurement mode and accordingly can achieve a fast measurement operation.

Figure 5:
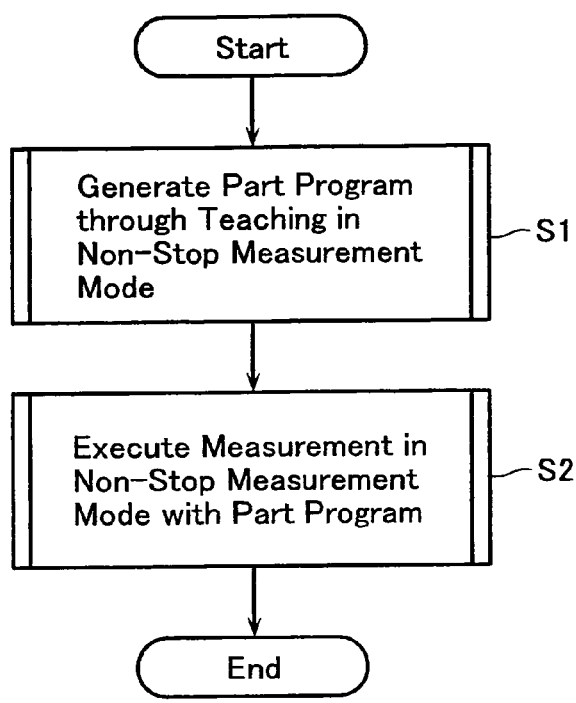
FIG. 5 is a flowchart showing generation of a measuring program and a measurement procedure in the non-stop measurement mode in the system.
Figure 8:
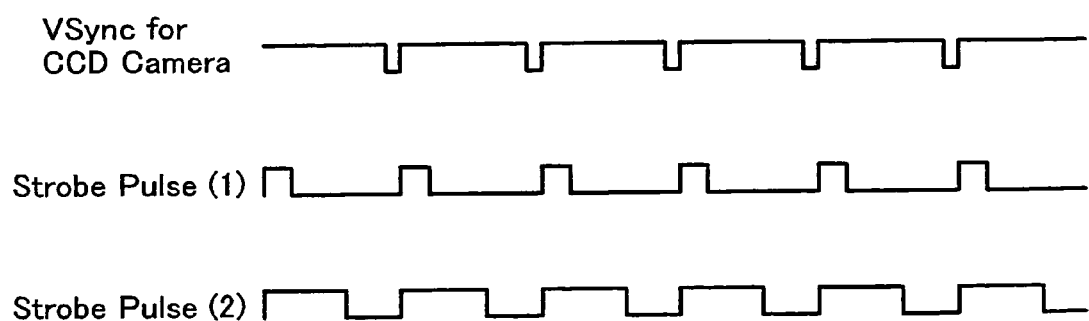
FIG. 8 is a waveform diagram illustrative of illumination adjustment control of the embodiment 1-1.

A flow of operation for such the non-stop image measurement is shown in FIG. 5.

First, a part program is generated through teaching in the non-stop measurement mode (S1), then the generated part program is employed to execute a non-stop measurement (S2). Two methods can be considered to execute the non-stop measurement shown in FIG. 4 through teaching similar to the conventional standard measurement mode. The first is such a method (an embodiment 1-1) that adds a new function to the part program generation (S1) to make the part program itself configured suitable for the non-stop measurement while leaving the part program execution (S2) itself almost same as the conventional one. The second is such a method (an embodiment 1-2) that adds no particularly new function to the part program generation (S1) itself and leaves the configuration of the part program almost same as the part program in the standard measurement mode. In this case, a new function is added to the part program execution (S2) to realize the non-stop measurement mode. The two methods are described below individually.

Embodiment 1-1

FIG. 6 shows an example of a part program to be generated.

This part program comprises three subroutine blocks (Sub QVBlock_1, Sub QVBlock_2, Sub QVBlock_3). In the first subroutine block (Sub QVBlock_1), instructions for setting a lens magnification and illumination are described in the first two lines, followed by movement path commands instructing movement and strobe illumination and image acquisition per measurement element. The second and third subroutine blocks (Sub QVBlock_2, Sub QVBlock_3) are measurement blocks.

The part program generator 36 operative to generate such the part program executes the following procedure.

(1) Among successive movement path commands, a movement path command for one measurement element, and a corresponding image reading command and an image processing command (such as edge detection) are created in parallel in two subroutine blocks, respectively.

(2) The commands shown in (1) are created corresponding to all paths. The image reading command and the image processing command (such as an edge detection command) are related to the movement path command through creation of a new subroutine block.

(3) A measurement start command (StrobePath.Acquire: a non-stop image acquisition command) is used to terminate a series of path generations.

Figure 7:
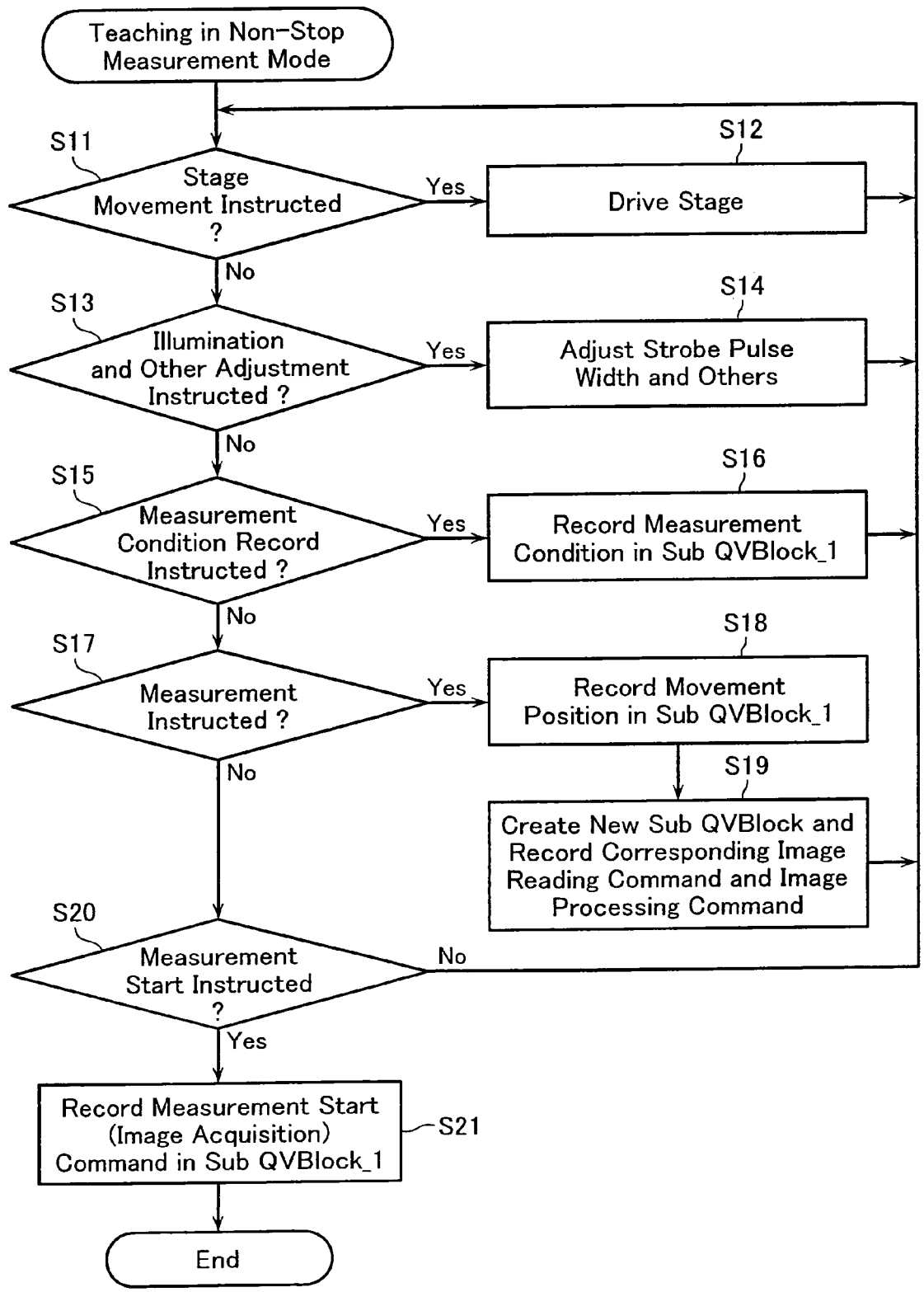
FIG. 7 is a flowchart showing processing for generating the part program of the embodiment 1-1.

This processing is specifically shown in FIG. 7.

First, whether a stage movement instruction is entered from input means is determined (S11) and, if the stage movement instruction is entered, then stage drive processing is executed (S12). This allows the operator to perform an operation for positioning the imaging range at a measurement position.

Next, whether an illumination and other adjustment instruction is entered from input means is determined (S13) and, if the adjustment instruction is entered, then processing for adjusting the strobe pulse width and others is executed (S14). The strobe pulse may be generated in synchronization with a vertical synchronizing signal (VSync) for the CCD camera 18. When the pulse width is widened from (1) to (2), an image displayed on the display unit 25 can be lightened as a whole. When the pulse width is narrowed from (2) to (1), to the contrary, an image displayed on the display unit 25 can be darkened as a whole. Therefore, the most appropriate amount of light may be determined visually through dialog adjustment within 0-100% while confirming the image displayed on the display unit 25. The strobe illumination may be realized with the use of an LED or a xenon lamp.

Next, whether a measurement condition record instruction is entered is determined (S15) and, if the record instruction is entered, then the measurement condition is recorded in the first subroutine block (Sub QVBlock_1) (S16). In the example of FIG. 6, lens and illumination settings are recorded in the beginning of "Sub QVBlock_1".

Subsequently, whether a measurement instruction is entered is determined (S17) and, if the measurement instruction is entered, then positional information indicative of a current position of the measurement stage 13 relative to the CCD camera 18 is recorded in "Sub QVBlock_1" as information about the movement position (S18). In addition, a new subroutine block is created and an image information reading command and an image processing command corresponding to the above information about the movement position are recorded in the new subroutine block (S19).

The above steps are repeated until a measurement start is instructed (S20). If the measurement start is instructed, then a measurement start (image acquisition) command is recorded in "Sub QVBlock_1" (S21), followed by terminating the processing.

In such the on-line teaching, the operator shifts the position of the measurement stage 13 relative to the CCD camera 18 to a measurement-intended position, and fixes the CCD camera 18 and the measurement stage 13 on that position. The operator then sets measurement conditions, for example, by focusing and adjusting the amount of light while confirming the display screen of the display unit 25, and enters a measurement instruction, thereby acquiring parameters required for the non-stop measurement at that position. As a result, through a teaching operation almost same as the on-line teaching in the conventional standard measurement mode, teaching in the non-stop measurement mode can be performed.

On execution of the part program thus generated, the generated part program is sequentially executed. In this case, the part program executor 38 may be configured almost similar to the conventional one.

Embodiment 1-2

In the embodiment 1-1 the part program itself is configured suitable for the non-stop measurement. To the contrary, in an embodiment 1-2 the part program itself is almost same as that in the standard measurement mode while processing in the part program executor 38 is different from the conventional one.

FIG. 9 shows a part program according to the embodiment 2.

The part program includes a command for switching to the non-stop measurement mode described in the beginning, and a command for switching to the standard measurement mode described in the tail. The part program comprises three subroutine blocks (Sub QVBlock_1, Sub QVBlock_2, Sub QVBlock_3), like the embodiment 1. In the first subroutine block (Sub QVBlock_1), instructions for setting measurement conditions such as a lens magnification and illumination are described. In the second and third subroutine blocks (Sub QVBlock_2, Sub QVBlock_3), described per measurement unit are commands of movement to the measurement position and strobe illumination and image acquisition, and image reading, measurement condition setting, image processing (edge detection), and measurement end.

This part program is generated almost in the following procedure.

(1) The time to start recording the part program is similar to the conventional standard measurement mode.

(2) The command for switching from the standard measurement mode to the non-stop measurement mode is selected and executed.

(3) In the non-stop measurement mode, through a series of stage movement commands (successive paths), stage movement, strobe pulse lightening and image acquisition at the time of strobe lightening are executed. The image at the time of strobe lightening is made to contain information about the stage position latched at the time of strobe lightening.

(4) After a series of stage movements, the images at the times of strobe lightening are read out piece by piece for use in execution of image processing such as edge detection.

(5) After completion of all processing, the command for switching from the non-stop measurement mode to the standard measurement mode is executed.

Figure 10:
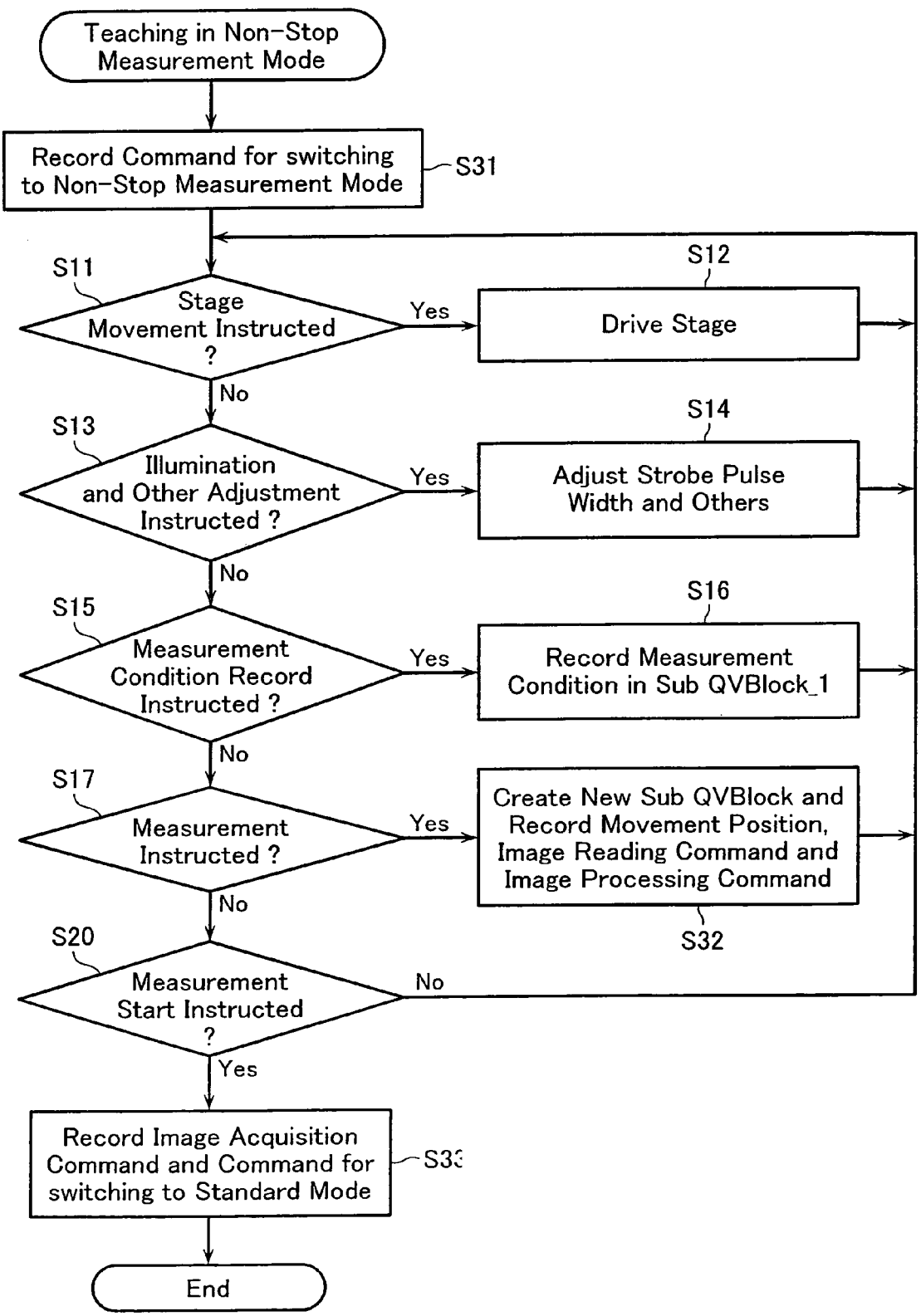
FIG. 10 is a flowchart showing processing for generating the part program of the embodiment 1-2.
Figure 12:
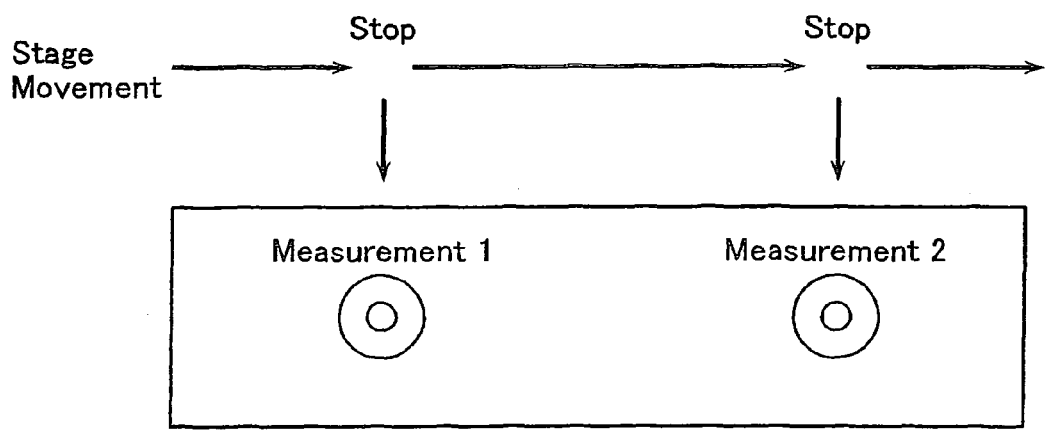
FIG. 12 illustrates measurement in the standard measurement mode.
Figure 13:
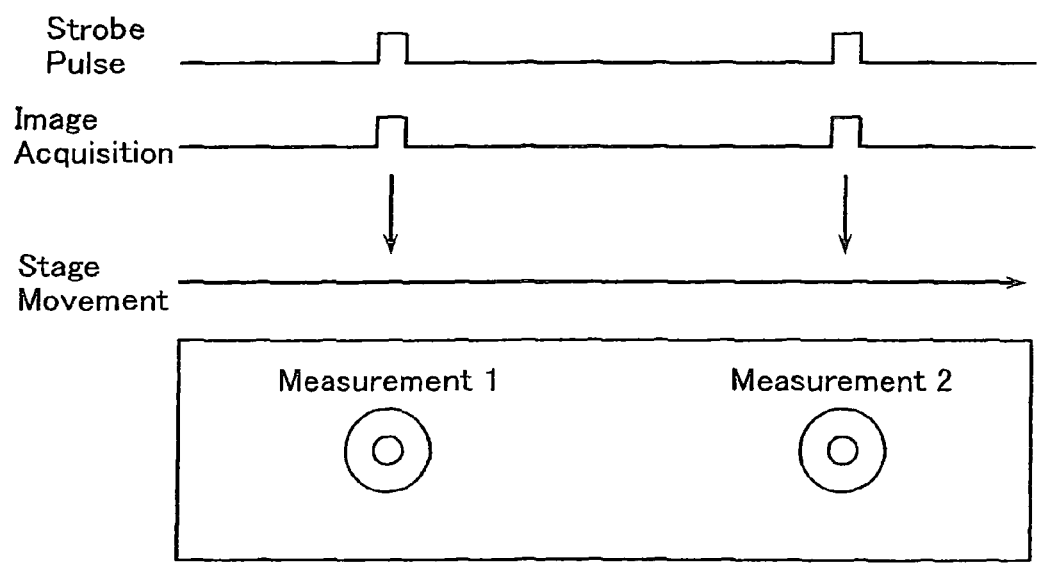
FIG. 13 illustrates measurement in the non-stop measurement mode.

The processing is specifically shown in FIG. 10.

Different from the flow of the embodiment 1 shown in FIG. 7, a command for switching to the non-stop measurement mode is recorded in the beginning (S31). In addition, if the measurement is instructed (S17), a new subroutine block is created, and a movement position, an image reading command and an image processing command per measurement unit are recorded (S32). Further, if the measurement start is instructed (S20), an image acquisition command and a command for switching to the standard measurement mode are recorded (S33). Other points including the illumination adjustment are similar to those in the embodiment 1.

The generated part program is executed as follows. The part program executor 38, on detection of the command for switching to the non-stop measurement mode in the beginning of the part program, repeatedly executes the processing twice, which lasts to the step immediately before the command for switching to the standard command. In this case, in the first execution, only the portions shown with bold characters in FIG. 11A, that is, the portions including measurement condition setting, movement position recording and non-stop image acquisition are executed. In the second execution, only the portions shown with bold characters in FIG. 11B, that is, the portions including image reading and image processing are executed.

It is possible even for such the part program generating method to generate a part program through teaching similar to the conventional one.

What is claimed is:

1. A method of generating a non-stop image measuring program for image measurement including moving an imaging means relative to a measurement stage supporting a measuring object while irradiating the measuring object with strobe illumination and capturing instantaneous image information about the measuring object at designated measurement positions without making a stop of the imaging means, the method comprising steps of:

moving the position of the imaging means relative to the measurement stage based on a stage movement instruction input;

adjusting the amount of light illuminating the measuring object by flashing the strobe illumination at a certain cycle repeatedly and adjusting the pulse width of the strobe illumination based on an illumination adjustment instruction input; and generating the measuring program for image measurement including fetching positional information about the imaging means relative to the measurement stage and information about the pulse width of the strobe illumination based on a certain instruction input, irradiating the measuring object while passing through the position indicated by the fetched positional information, with the strobe illumination of the pulse width fetched at that position, and capturing instantaneous image information about the measuring object.

2. The method according to claim 1, the step of generating the measuring program including steps of recording the positional information in a first subroutine block every time the positional information is fetched, and creating a new subroutine block to record in the new subroutine block an image read command and an image processing command corresponding to the positional information, and recording on receipt of a measurement start instruction a command for instructing image acquisition start behind a series of the positional information in the first subroutine block.

3. The method according to claim 1, the step of generating the measuring program including steps of recording at the beginning of the program a command for switching to a non-stop measurement mode, creating a new subroutine block every time the positional information is fetched and recording the positional information in the created subroutine block, and recording in the subroutine block an image read command and an image processing command corresponding to the positional information, and recording on receipt of a measurement start instruction a command for instructing image acquisition start behind a final subroutine block.

4. An image measuring system having a non-stop measurement mode for image measurement including moving an imaging means relative to a measurement stage supporting a measuring object while irradiating the measuring object with strobe illumination and capturing instantaneous image information about the measuring object at designated measurement positions without making a stop of the imaging means, the system comprising:

a means operative to enter a stage movement instruction, an illumination adjustment instruction and other certain instructions;

a means operative to move the position of the imaging means relative to the measurement stage based on the entered stage movement instruction;

a means operative to adjust the amount of light illuminating the measuring object by flashing the strobe illumination at a certain cycle repeatedly and adjusting the pulse width of the strobe illumination based on the entered illumination adjustment instruction; and a means operative to generate the measuring program for image measurement including fetching positional information about the imaging means relative to the measurement stage and information about the pulse width of the strobe illumination based on the entered certain instructions, irradiating the measuring object while passing through the position indicated by the fetched positional information, with the strobe illumination of the pulse width fetched at that position, and capturing instantaneous image information about the measuring object.

* * * * *